United States Patent [19]

Kataoka et al.

[11] 3,753,202

[45] Aug. 14, 1973

[54] DISPLACEMENT TRANSDUCER

[75] Inventors: Shoei Kataoka, Tanashi-shi, Tokyo; Hideo Yamada, Setagaya-ku, Tokyo, both of Japan

[73] Assignee: Kogyo Gijutsuin (a/k/a Agency of Industrial Science and Technology Ministry of International Trade and Industry), Tokyo-To, Japan

[22] Filed: Apr. 29, 1971

[21] Appl. No.: 138,508

[30] Foreign Application Priority Data
May 1, 1970 Japan.............................. 45/37446

[52] U.S. Cl............................. 338/32 H, 323/94 H
[51] Int. Cl................................................. H01c 7/16
[58] Field of Search...................... 338/32 R, 32 H; 324/46, 34 PS; 323/94 H

[56] References Cited
UNITED STATES PATENTS
3,286,161  11/1966  Jones et al. .................. 338/32 R X
3,267,404  8/1966  Hieronymus..................... 338/32 H
3,335,384  8/1967  Weiss.......................... 338/32 R X FOREIGN PATENTS OR APPLICATIONS
1,290,341  8/1964  Germany........................ 324/34 PS

*Primary Examiner*—C. L. Albritton
*Attorney*—Robert E. Burns and Emmanuel J. Lobato

[57] ABSTRACT

A displacement transducer is comprised of an magnetoresistive element, or an elongated semiconductor member having the magnetoresistive effect. A pair of electrodes are affixed at both ends of this magnetoresistive element, and a third electrode at the center. While an electric current is made to flow therethrough from each of the pair of electrodes to the third electrode, an applied magnetic field is moved thereon toward either side of the third electrode to obtain an output voltage due to the magnetoresistive effect of the element. In another embodiment of the invention, wherein a plurality of metal boundaries are formed at intervals between a pair of electrodes at both ends of an magnetoresistive element, a leading end of an applied magnetic field is inclined to such a degree as to extend between at least two adjoining ones of the metal boundaries.

10 Claims, 24 Drawing Figures

Patented Aug. 14, 1973 3,753,202

CHANNEL(I) CHANNEL(II)

DISPLACEMENT TRANSDUCER

BACKGROUND OF THE INVENTION

This invention relates to a displacement transducer wherein displacement of an applied magnetic field from its predetermined position on a semiconductor element is converted into a voltage due to its magnetoresistive effect, i.e. the change in its electrical resistance caused by the applied magnetic field. The semiconductor element with its magnetoresistive effect is referred to as the "magnetoresistive element" throughout the present specification.

Conventional versions of such displacement-to-voltage transducer include, for example, a slide-type potentiometric device wherein an electrode is made to slide on a resistance element. The mechanical contact exploited in this prior device has resulted in ready damage and wear of the related parts and has also led to the production of too much noise. When, specifically, a wirewound resistor is employed as the resistance element, the output voltage has not varied smoothly enough, but rather stepwise, along with change in the amount of the displacement. The provision of the slide-type potentiometer has also made the overall apparatus considerably bulky.

There are some known devices which attempt to promote the magnetoresistive effect of a semiconductor by dividing it into several portions by means of transverse metal boundaries. Here again, however, the metal boundaries so dividing the magnetoresistive element has caused stepwise change in the output voltage as a magnetic field is moved on the element perpendicularly to the strips.

According to a displacement transducer already applied for a patent by the present applicant and now pending (the United States application Ser. No. 817,934), two individual magnetic fields are required which move in an interrelated manner. Moreover, the permitted ranges of movements of the magnetic fields are somewhat narrowly confined, each being permitted to move either annularly through an angle of 90° or linearly over a quarter of the length of the magnetoresistive element in use.

SUMMARY OF THE INVENTION

It is an object of the present invention to provde a displacement transducer of simple construction which delivers a great output voltage in comparison with the amount of displacement of a magnetic field by making efficient use of the magnetoresistive effect of a semiconductor.

Another object of the invention is to provide a displacement transducer capable of converting two-dimensional displacement of a magnetic field into two independent electrical quantities.

Another object of the invention is to provide a displacement transducer wherein one or both ends of a magnetic field applied to an magnetoresistive element having a plurality of metal strips or boundaries are inclined in such a manner that an output voltage is obtained which varies smoothly enough along with change in the amount of displacement of the magnetic field.

A further object of the invention is to provide a displacement transducer wherein only one mobile magnetic field is required to produce an output voltage equal to that hitherto obtained only by the application of two individual magnetic fields, the one magnetic field in the displacement transducer of the invention being permitted to move through a greater angle or for a greater distance.

Other objects, features and advantages of this invention will be apparent from the following detailed description when read in connection with the accompanying drawings.

DETAILED DESCRIPTION OF THE INVENTION

Figure 1A:
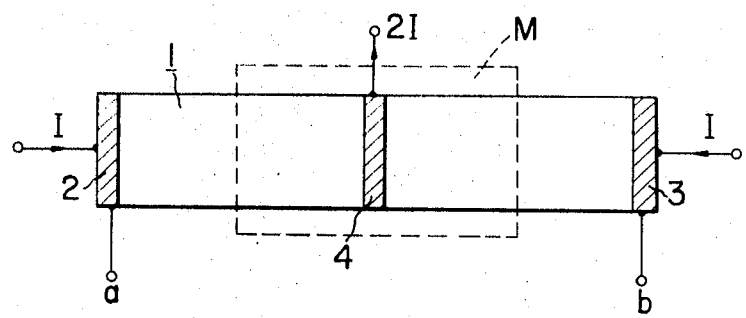
FIGS. 1($a$), ($b$) and ($c$) are both schematic and explanatory representations of a displacement transducer in accordance with the concepts of the present invention.

Referring now to the drawings, and first of all to FIG. 1(a), (b) and (c) in order to describe the first embodiment of the invention illustrated therein, a magnetoresistive element 1 is affixed with electrodes 2, 3 and 4 at its both ends and center. The magnetoresistive element may be made of materials having magnetoresistive effect, for example, material of high mobility such as a compound consisted of the elements selected from third and fifth group of perioderic table, for example, InSb, InAs, GaAs. Constant currents I are made to flow through this magnetoresistive element 1 from the electrodes 2 and 3 at both ends to the center electrode 4 or vice versa. If, then, a unidirection magnetic field M is applied at the center of this magnetoresistive element 1 in a direction at right angles therewith, as illustrated in FIG. 1(a), the electrical resistance of this element 1 is increased at its part being subjected to the magnetic field M. Since, however, equal portions of the left hand half and the right hand half of the magnetoresistive element 1 are subjected to the magnetic field M, and since the equal remaining portions thereof are not, electrical resistance $R_{24}$ between the electrodes 2 and 4 equals electrical resistance $R_{34}$ between the electrodes 3 and 4. Let this electrical resistance $R_{24}$ or $R_{34}$ be represented by R.

Figure 1B:
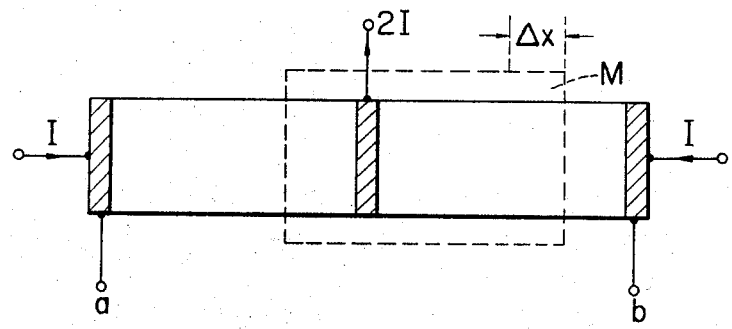

Suppose now that the unidirectional magnetic field M is moved in the right hand direction by the amount equal to $\Delta x$ as illustrated in FIG. 1(b). The electrical resistance $R_{34}$ between the electrodes 3 and 4 of the magnetoresistive element 1 will be increased to $R + \Delta R$ since then the right hand half is subjected to the magnetic field M at its portion increased correspondingly to the amount of the magnetic field M from its central position. On the other hand, the electrical resistance $R_{24}$ between the electrodes 2 and 4 of the magnetoresistive element 1 has to be decreased to $R - \Delta R$ as its portion being applied with the magnetic field M is decreased correspondingly.

Figure 1C:
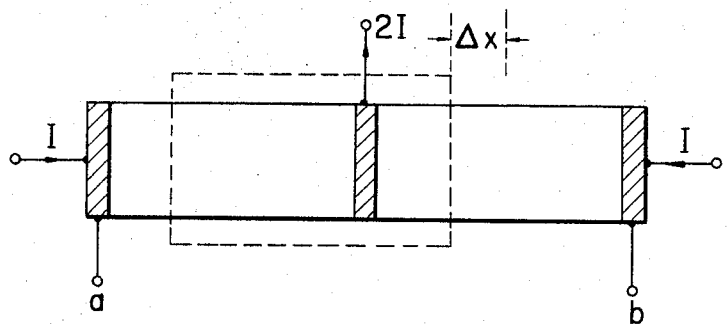

If equal constant currents I are made to flow through this magnetoresistive element 1 from the electrodes 2 and 3, respectively, to the center electrode 4, voltage $V_{34}$ between the electrodes 3 and 4 varies from IR to $IR + I \cdot \Delta R$, while voltage $V_{24}$ between the electrodes 2 and 4 varies from IR to $IR - I \cdot \Delta R$. Since the overall voltage between the electrodes 2 and 3 thus totals $2\Delta R \cdot I$, there is obtained an output voltage in proportion to the displacement $\Delta x$ of the magnetic field M from output terminals a and b attached to the electrodes 2 and 3, respectively. It will be needless to say that when the magnetic field M makes a "negative" displacement, i.e. in the left hand direction as illustrated in FIG. 1(c), a negative output voltage is obtained which also is proportional to the amount of the displacement.

Figure 2:
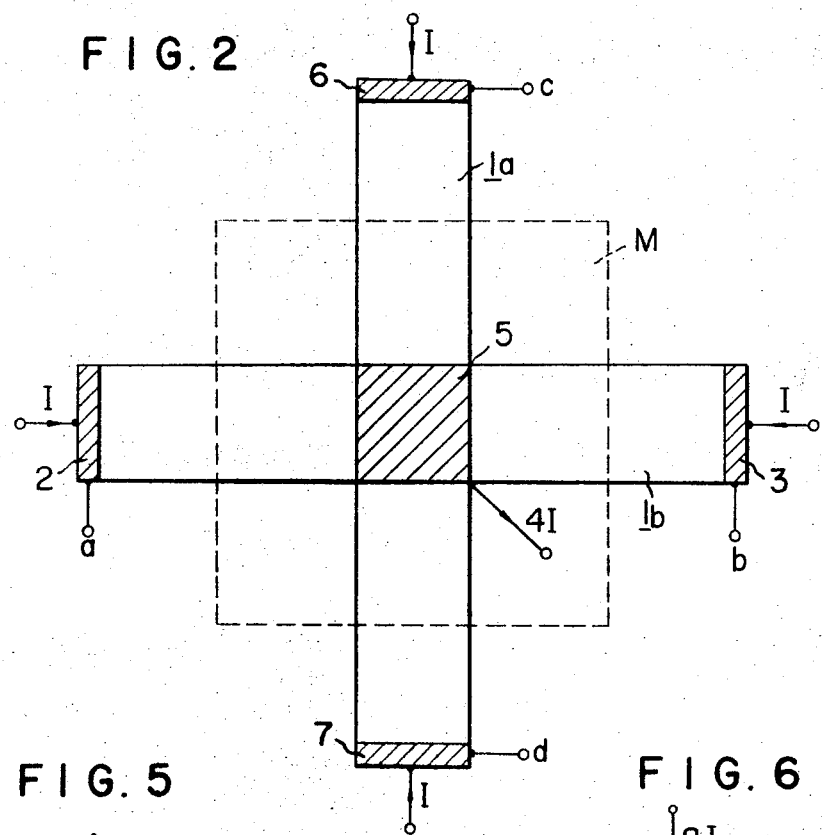
FIG. 2 schematically illustrates a second embodiment of the invention wherein the transducer is designed to convert two-dimensional displacement of a magnetic field into two independent electrical quantities.

The fundamental concepts underlying the above described first embodiment of the invention are also exploited in the second embodiment illustrated in FIG. 2, in which two-dimensional displacement of a magnetic field is converted into two independent voltages. Two magnetoresistive 1a and 1b are combined into the shape of a cross. Four electrodes 2, 3, 6 and 7 are affixed at the ends of the four arms, and another electrode 5 at the center. Square magnetic field M is applied centrally to this cross shaped magnetoresistive element as illustrated in the drawing, and constant currents I are made to flow therethrough from the four electrodes 2, 3, 6 and 7 to the common center electrode 5 or vice versa. In this instance, if the four arms are of the same material and of the same shape, and if the square magnetic field M is located exactly centrally of this cross shaped magnetoresistive element, the arms will have the same electrical resistance so that no voltage will be existent between the electrodes 2 and 3 or between the electrodes 6 and 7.

If the magnetic field M is moved horizontally on this cross shaped magnetoresistive element as viewed in FIG. 2, a voltage corresponding to the amount of the horizontal displacement from the exactly central location is obtained terminals a and b attached to the electrodes 2 and 3 of the horizontally extending arms, for reasons described already in connection with the first embodiment of the invention illustrated in FIG. 1. Since, however, the magnetic field is assumed to be exactly square in shape, its only horizontal displacement does not cause any change in the areas of those portions of the vertically extending arms which are subjected thereto. No voltage is then produced between terminals c and d attached to the electrodes 6 and 7. For the same reasons, vertical displacement of the magnetic field M produces a corresponding voltage between the terminals c and d and no voltage between the terminals a and b. Considered generally, when the magnetic field M is moved in a certain direction, there is obtained between the terminals a and b and/or between the terminals c and d a voltage or voltages depending upon of the horizontal and vertical components of displacement of the magnetic field M from its exactly central location of the magnetoresistive element.

In practice, however, the shapes and the materials, and therefore the electrical resistance, of the respective arms of the linear and the cross shaped magnetoresistive element (illustrated in FIGS. 1 and 2) may not be alike. The constant currents I that are made to flow through the respective arms may not necessarily be equal, either. In such cases a location of the magnetic field M at which no voltage is produced between the associated pair or pairs of the terminals can be regarded as an origin of its one- or two-dimensional displacement. Displacement of the magnetic field M from its origin thus determined will be converted into desired electrical voltage.

Figure 3:
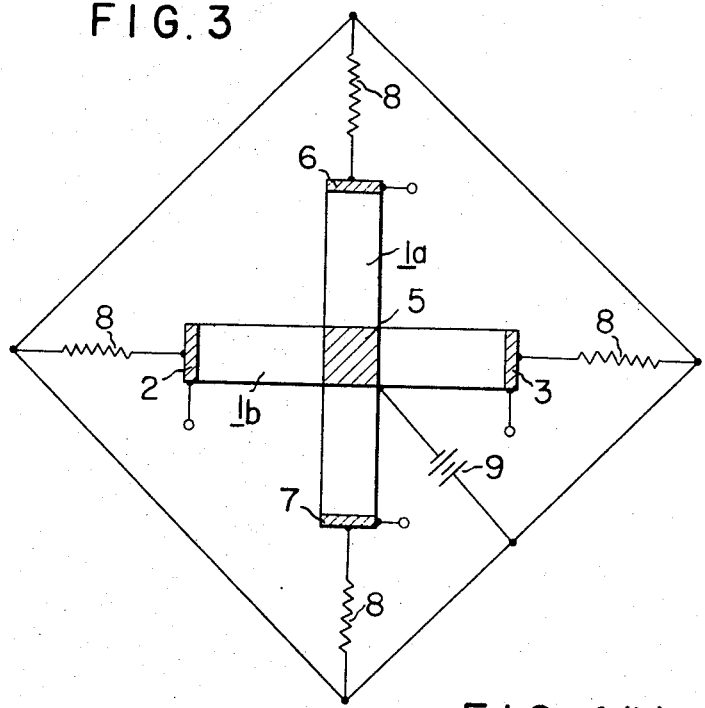
FIG. 3 also schematically illustrates the magnetoresistive element in FIG. 2 in combination with a circuit adapted for application of a constant current to each the four electrodes.

With reference now to FIG. 3, resistances 8 of appropriately high value are respectively connected in series with the electrodes 2, 3, 6 and 7 at the ends of four arms of the cross shaped magnetoresistive element of FIG. 2, the other ends of the resistances 8 being all interconnected. A power supply 9 capable of delivering a constant voltage is connected between the interconnected ends of the resistances 8 and the center electrode 5. The desired functions of the cross shaped magnetoresistive element described precedingly with relation to FIG. 2 can be obtained by this examplary configuration. It will be understood that the semiconductor making up the cross shaped magnetoresistive element may not be all of one piece, but that only the necessary portions of its arms may be made of separate semiconductor members only if these are properly electrically interconnected at the center.

Figure 4A:
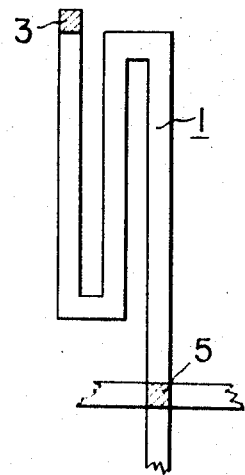
FIGS. 4($a$) and ($b$) are schematic, fragmentary representations of modified examples of the shape of the magnetoresistive element in FIGS. 2 and 3.
Figure 4B:
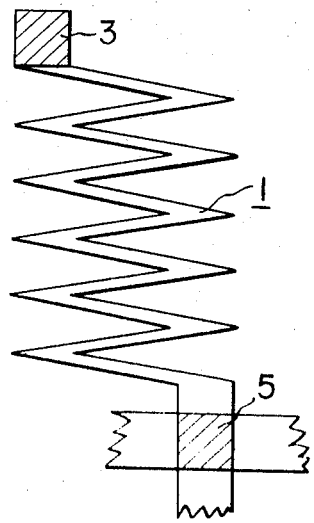

Further the arms of the magnetoresistive element of FIG. 2 or 3 may adopt various shapes depending in part upon applications. For example, they may be in the zigzag shape as illustrated in FIGS. 4(a) and (b). The increased overall length of each arm serves to increase the resistance. It will also be obvious that the magnetoresistive effect of the semiconductor in general is further promoted when a number of metal boundaries are built therein.

Figure 5:
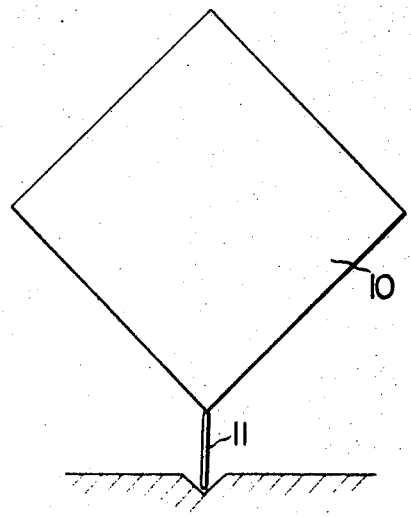
FIG. 5 schematically illustrates an example of application of the displacement transducer of FIGS. 2 and 3 in a pickup of a stereophonic record player.

FIG. 5 illustrates an example of application of the above described two-dimensional displacement transducer in a pickup of a stereophonic record player. A stylus 11 is coupled to a square shaped member 10 of magnetic material adapted for production of a mobile magnetic field, and its right angled displacements caused by a two-channel groove of a stereo record are respectively translated into electrical signals.

Figure 6:
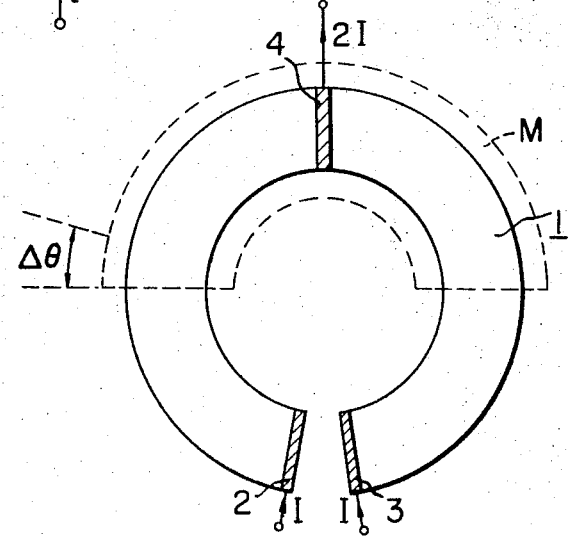
FIG. 6 schematically illustrates a third embodiment of the invention wherein the transducer is designed to convert rotary displacement of a magnetic field into a voltage.

FIG. 6 illustrates a third embodiment of the invention, in which the fundamental principles described above with reference to FIG. 1 are utilized for conversion of rotary displacement of a magnetic field into a corresponding voltage. A magnetoresistive element 1 is in a circular configuration with a gap, with electrodes 2, 3 and 4 affixed at both ends and at a center. Suppose that an arched magnetic field M is first applied concentrically with the said magnetoresistive element 1 and so as to be in symmetry on both sides of the center electrode 4, and that electric currents I of equal magnitude are made to flow from the electrodes 2 and 3 at both ends to the center electrode 4. No voltage will then be produced as already described. But when the magnetic field M is turned through an angle $\Delta\theta$, a voltage corresponding thereto will be delivered from the terminals connected to the electrodes 2 and 3.

Figure 7A:
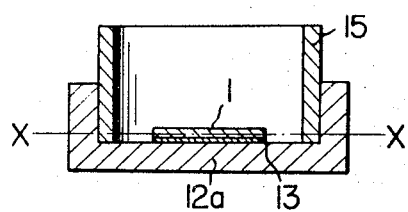
FIGS. 7($a$) and ($b$) are vertical and horizontal sectional views, respectively taken along the lines X—X and X'—X' indicated in the corresponding drawings, showing a more practical configuration of the displacement transducer of FIG. 6.
Figure 7A:
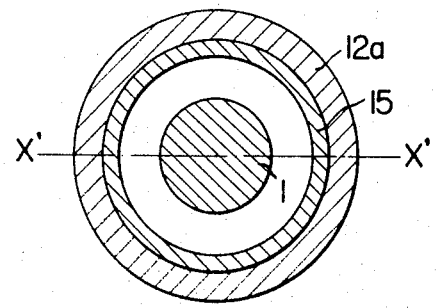
Figure 7B:
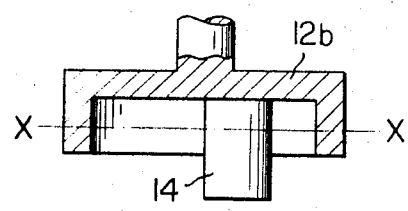
Figure 7B:
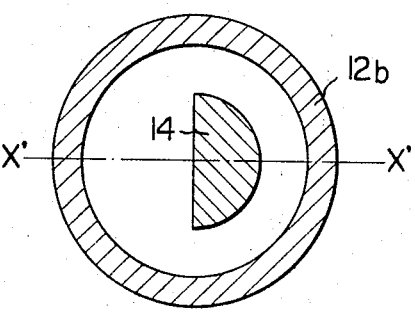

FIG. 7(a) and (b) show a more practical example of such rotary displacement transducer. The magnetoresistive element 1 of a semiconductor material is mounted, through an insulator 13, centrally upon a magnetic member 12a in the shape of an upwardly rimmed disk as illustrated in FIG. 7(a). On the other hand, with reference to FIG. 7(b), there is provided a corresponding magnetic member 12b in the shape of a downwardly rimmed disk to which is secured a permanent magnet 14 of suitable cross sectional shape, for example, semicircular or sector shape. A center of circle formed by arc of permanent magnet 14 coincides with a center of the magnetoresistive element. This magnetic member 12b with its permanent magnet 14 is concentrically mounted on the former magnetic member 12a through a guide 15, the vertical length of the permanent magnet 14 being such that when the magnetic members 12a and 12b are so combined, there will be a slight spacing between itself and the magnetoresistive element 1. In this manner the location of the magnetic field produced by the permanent magnet 14 on the magnetoresistive element 1 can be varied relative to the latter by turning the magnetic member 12b. As an added advantage the desired magnetic field in the above configuration is not susceptible to demagnetization and can substantially permanently retain its initial intensity.

Figure 8A:
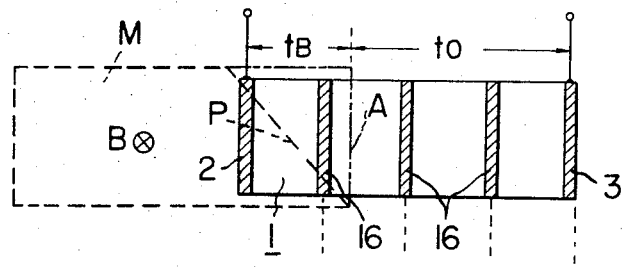
FIG. 8($a$) is a both schematic and explanatory representation of a further embodiment of the invention, while FIGS. 8($b$) and 8($c$) are show characteristics curves in prior art.

In FIG. 8(a) a number of metal boundaries 16 are formed at substantially constant intervals between electrodes 2 and 3 of an magnetoresistive element 1c with a view to further improvement of its magnetoresistive characteristics. These metal boundaries 16 are formed either by vacuum evaporation, plating or any other suitable process. Since then the electric field at each of these metal boundaries 16 has to be perpendicular to the boundaries between the metal and the semiconductor, the direction of current flow is inclined by the so-called Hall angle when a magnetic field is applied. The result is more pronounced magnetoresistive effect.

Figure 8B:
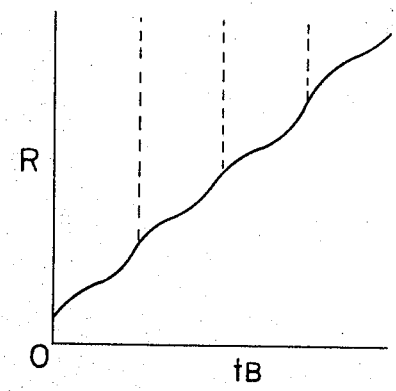
Figure 8C:
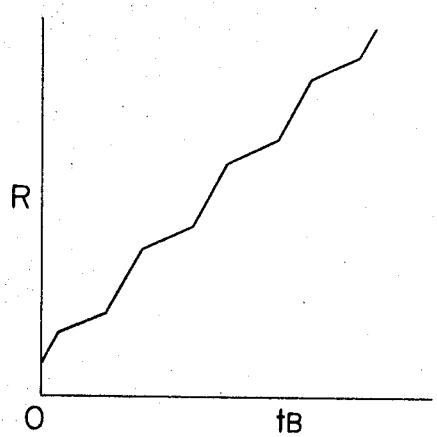

When, however, a magnetic field M with a flat or noninclined end A (indicated by a two dotted line in the drawing) in prior art is moved on the above configured magnetoresistive element 1c, the resultant change in its electrical resistance does not always exhibit a linear relationship with the amount of displacement of the magnetic field, as graphically demonstrated in FIGS. 8(b) and 8(c). This obviously is due to the fact that increase in the electrical resistance of the magnetoresistive element 1c caused upon application of a magnetic field thereto is most marked at the boundaries between the metal boundaries and the semiconductor.

According to the present invention, in order to eliminate such a non-smooth relationship between the change in the electrical resistance and the amount of the displacement, there is applied to the magnetoresistive element 1c a magnetic field having an inclined end P as indicated by a dotted line in FIG. 8(a). It is imperative that the end P of the magnetic field M is inclined to such a degree as to extend between at least two adjoining ones of the metal boundaries 16 whereby each of the successive boundaries 16 may gradually go in and out of the magnetic field M as the same is displaced thereon.

Figure 9:
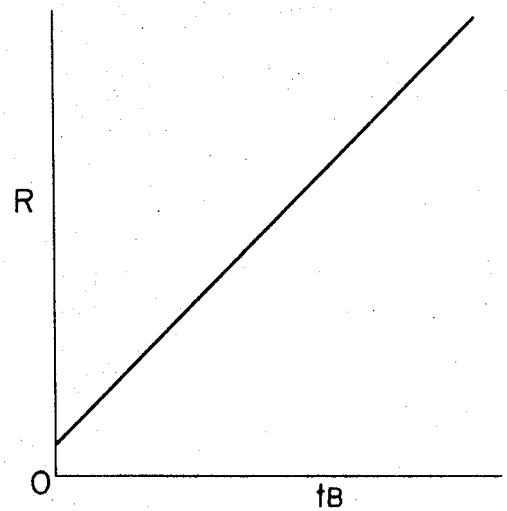
FIG. 9 is a graph showing a linear relationship between the magnetoresistance of the electromagneto element in FIG. 8($a$) and the amount of the displacement of the magnetic field in the transducer according to the invention.
Figure 10:
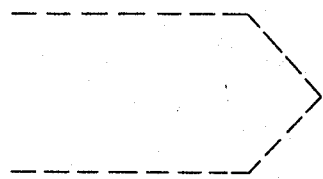
FIG. 10 schematically illustrates a modified example of the shape of the leading end of the magnetic field in FIG. 8($a$)

FIG. 9 is a graphic representation of the relationship between the change in the electrical resistance of the magnetoresistance element 1c and the amount of the displacement of the magnetic field M having the inclined end P. It will be obvious that the end of the magnetic field M can be sharpended as indicated by a dashed line of FIG. 10 to obtain the same results.

Direction of the inclination may be in any direction along the width and/or the thickness of said element.

Figure 11:
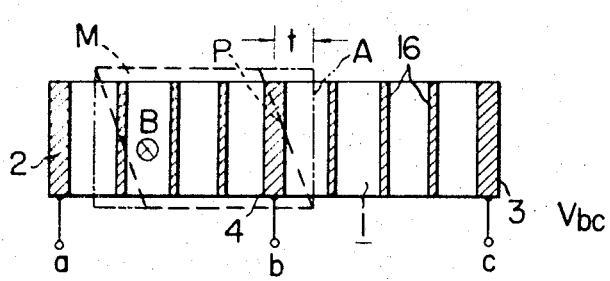
FIG. 11 is both a schematic and explanatory representation of a still further embodiment of the invention, FIGS. 12 ($a$) ($b$) and 12 ($c$) are both schematic and explanatory representations of a further embodiment of the invention comprising a plurality of magnetoresistive elements as shown in FIG. 11 to which are commonly applied a single displaceable magnetic field.

FIG. 11 shows an example of application of the foregoing embodiment of the present invention in a three-terminal potentiometer utilizing a magnetoresistive element. FIG. 11(a) schematically illustrates a three-terminal potentiometric transducer comprising a magnetoresistive element 1, a pair of electrodes 2 and 3 at both ends, a center electrode 4 and a number of metal boundaries 16. According to the prior art, a magnetic field B having flat or noninclined ends A, as indicated by dashed lines in the drawing, has been applied only to approximately one half of the entire length of the magnetoresistive element 1. By moving the former relative to the latter, a desired variable fraction $V_{bc}$ of input voltage $V_{ab}$ which has been applied between terminals a and b attached to the electrodes 2 and 4, respectively, is obtained between terminals b and c attached to the electrodes 4 and 3 or between terminals a and c attached to the electrodes 2 and 4, respectively. Upon closer observation of this voltage $V_{bc}$ between the voltage dividing electrodes 4 and 3, for instance, it has been revealed that the voltage fraction $V_{bc}$ does not change smoothly enough along with variation of the amount of displacement of the magnetic field B, but changes non-smoothly in similar to those illustrated in FIGS. 8(b) and 8(c). Contrastively, a smooth relationship therebetween as shown in FIG. 9 is obtainable by the displacement of an applied magnetic field M in accordance with the present invention. The both ends of this magnetic field M are inclined enough to extend between at least two adjoining ones of the metal boundaries 16.

Figure 12C:
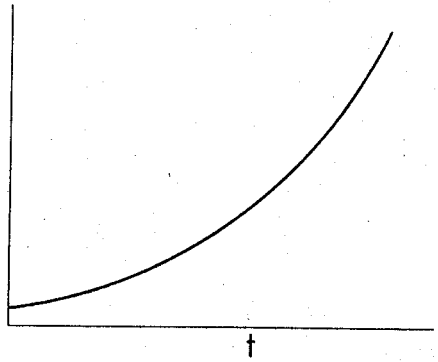
Figure 12A:
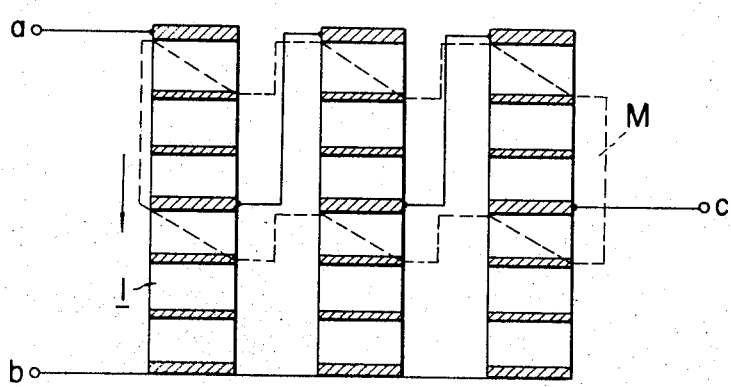
Figure 12B:
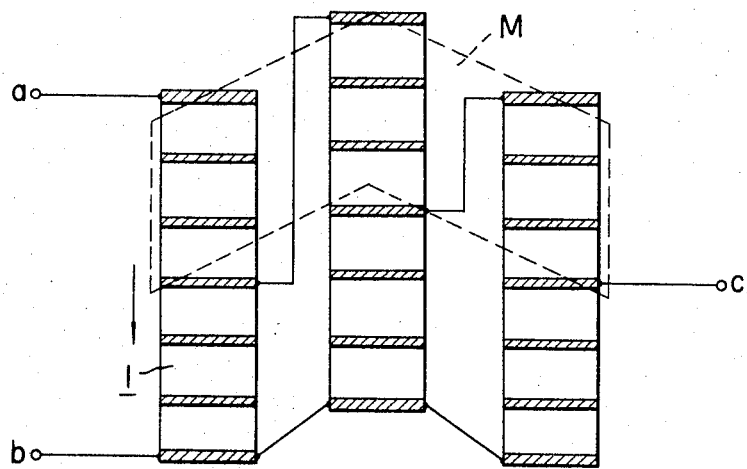

FIG. 12(a) and (b) illustrate two other examples of the combination of FIG. 11(a). In each of the illustrated configurations a plurality of magnetoresistive element 1 are arranged in parallel to which is commonly applied a magnetic field M, with a view to more pronounced change in the output voltage $V_{bc}$ as the magnetic field M is moved on the magnetoresistive elements 1 from one end to the other. Moreover, since both ends of the magnetic field M are inclined as described already in connection with FIG. 11(a), smooth variation of the output voltage is ensured as illustrated in FIG. 12(c).

Figure 13:
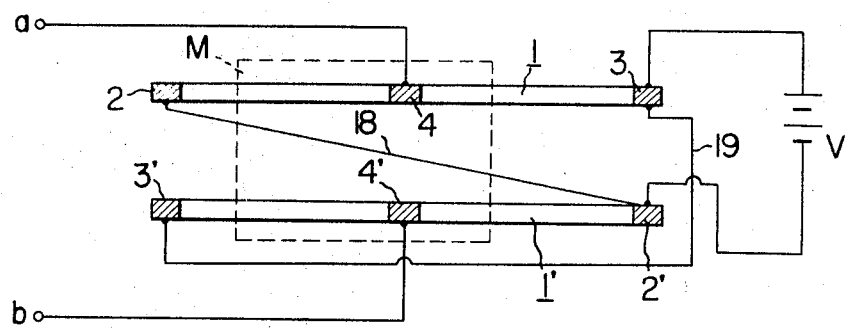
FIG. 13 schematically illustrates still a further embodiment of the present invention comprising a pair of parallel magnetoresistive elements to which is commonly applied a single displaceable magnetic field.

FIG. 13 illustrates a further embodiment of the present invention, wherein a pair of magnetoresistive elements 1 and 1' are arranged in parallel with each other and are connected in parallel by means of a conductor 18 extending between electrodes 2 and 2' and a conductor 19 extending between electrodes 3 and 3'. A power supply capable of feeding electrical energy in the form of a constant voltage V is connected between the electrodes 2' and 3. Output terminals a and b are connected to output electrodes 4 and 4' which are provided in the center of the magnetoresistive elements 1 and 1'.

In operation the voltage V is applied between the electrodes 2' and 3, and a unidirectional magnetic field M is applied which extends over not more than approximately one half of the length of each of the magnetoresistive elements 1 and 1'. By moving the magnetic field M relative to the magnetoresistive elements 1 and 1' there will be obtained between the output terminals a and b a combined output voltage of the magnetoresistive elements 1 and 1' depending upon the amount of the displacement. Hence only one magnetic field need be applied to produce an output voltage obtained heretofore by the application of two separate magnetic fields as described in said co-pending application Ser. No. 817934.

Figure 14:
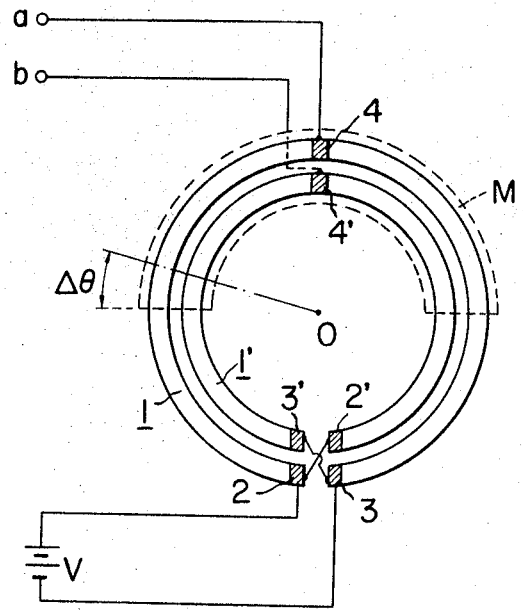
FIG. 14 also schematically illustrates a modified example of the displacement transducer of FIG. 13, comprising a pair of parallel magneto resistive elements each in the shape of an arc.

A modified example of the embodiment of FIG. 13 is illustrated in FIG. 14, in which a pair of magnetoresistive elements 1 and 1' are made in the shape of an arc or arcuate sector approximating a complete circle and are arranged concentrically. An arcuate unidirectional magnetic field M is applied thereto in a manner described precedingly in connection with the third embodiment of the invention illustrated in FIG. 6.

Other details of configuration are patterned after the foregoing embodiment of FIG. 13. In this manner a voltage of $\pm 2\Delta V$ is produced between output terminals a and b by the displacement of the magnetic field M through an angle of $\pm \Delta\theta$. The voltage $\Delta V$ is proportional to the angle $\Delta\theta$.

Although there have been described embodiments obtaining only one output in correspondence to the displacement of the magnetic field, it will be apparent that there can be obtained two outputs of opposite polarities in other embodiments, if two magnetoresistive element are provided under a common magnetic field, and voltages are applied to these elements.

Figure 15:
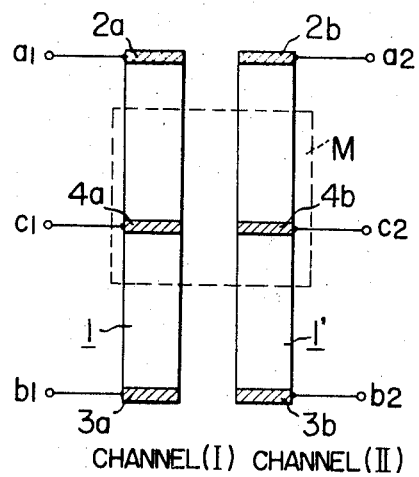
FIG. 15 is both a schematic and explanatory representation of a still further embodiment of the invention comprising a pair of magnetoresistive elements to which is commonly applied a single magnetic field.

For instance, in an embodiment shown in FIG. 15, magnetoresistive elements 1 and 1' affixed with electrodes 2a, 3a, 4a and 2b, 3b, 4b, respectively, are arranged in parallel, and a magnetic field is commonly applied to both of the magnetoresistive elements 1a and 1b, so that channel I and channel II are thereby formed.

When an input voltage is applied across terminals a1 and b1 connected to the electrodes 2a and 3a of the channel I, an output voltage is to be obtained between the terminals c1 and b1. However, minimum voltage will appear across the output terminals when the magnetic field M is applied only to the upper half of the magnetoresistive element 1, and an output voltage will be increased when the magnetic field is moved downward and the maximum output voltage is obtained when the magnetic field is applied only to the lower half of the magnetoresistive element.

Contrastively, in the channel II, an output voltage is obtained from terminals a2 and c2 when an input voltage is applied between the terminals a2 and b2. Hence, in this case a maximum output voltage is produced when the magnetic field M is applied only to the upper half of the magnetoresistive element 1', the output voltage gradually decreases as the magnetic field is moved part the center electrode 4b to the lower half.

Thus in the embodiment shown in FIG. 15, the characteristic of the output voltage in two channels against the displacement of the magnetic field M are opposite to each other and thus the adjustment in balance between the output voltages from the channel I and channel II can easily be achieved by the movement of the single magnetic field.

Figure 16:
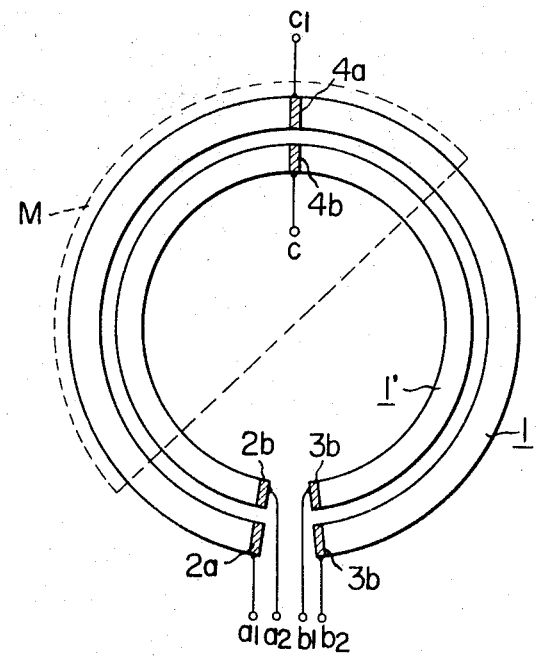
FIG. 16 also schematically illustrates a modified example of the displacement of FIG. 15.

In FIG. 16, there is indicated a modified example of the foregoing embodiment of FIG. 15 wherein the magnetic field is moved rotationally. As illustrated, magnetoresistive elements 1 and 1' are arranged concentrically, and a semicircular magnetic field M is applied commonly to both of the elements. The operation of this example is quite similar to that described in connection with the embodiment of FIG. 15. These embodiments illustrated in FIGS. 15 and 16 are very useful for the balance control in a stereophonic instrument.

Throughout all the foregoing embodiments of the present invention, as well as the examples of their modification or application, the magnetic field M may be produced either by a permanent magnet, a coil or any other means suitable for the objects of the invention. Further, although the invention has shown and described in the foregoing in very specific aspects thereof, it will be obvious to those skilled in the art that further modifications or applications of the invention may be resorted to in a manner limited only by a just interpretation of the appended claims.

The input voltage and current may be variable. This displacement transducer may be used as a volume control device of contactless type.

We claim:

1. A transducer for converting the relative displacement of a unidirectional magnetic field into an electrical signal comprising: two geometrically alike magnetoresistive portions; means for applying electrical energy to said magnetoresistive portions to effect current flow in opposite directions through both portions; means for applying a unidirectional magnetic field simultaneously to both said magnetresistive portions to vary the resistance thereof and coacting with said magnetoresistive portions to allow relative displacement between the unidirectional magnetic field and said magnetoresistive portions; and means connected to said magnetoresistive portions and responsive to the displacement of the unidirectional magnetic field relative thereto for developing an electrical signal having one polarity when the unidirectional magnetic field is displaced in one direction relative to said magnetoresistive portions from a given reference plane and having an opposite polarity when the unidirectional magnetic field is displaced in an opposite direction relative to said magnetoresistive portions from said reference plane and having a magnitude proportional to the extent of displacement from said reference plane.

2. A transducer according to claim 1; wherein said two magnetoresistive portions comprise two portions of a single magnetoresistive element each disposed on opposite sides of said reference plane which extends through the geometrical center of said magnetoresistive element.

3. A transducer according to claim 2; wherein said means for applying electrical energy and said means for developing an electrical signal include a pair of end electrodes each attached to one end of said magnetoresistive element, and a center electrode attached to said magnetoresistive element at its geometrical center.

4. A transducer according to claim 2, wherein said two magnetoresistive portions comprise two distinct magnetoresistive elements disposed in parallel relationship and having said reference plane extending through the geometrical centers of both said magnetroresistive elements.

5. A transducer according to claim 4; wherein said means for applying electrical energy and said means for developing an electrical signal include four end electrodes attached respectively to the four ends of said two magnetoresistive elements, and two center electrodes attached respectively to the geometrical centers of said two magnetoresistive elements.

6. A transducer according to claim 4; wherein said two magnetoresistive elements extend linearly in the directions of relative displacement between same and said unidirectional magnetic field.

7. A transducer according to claim 4; wherein said two magnetoresistive elements extend curvilinearly along a circular arc in the direction of relative displacement between same and said unidirectional magnetic field.

8. A transducer according to claim 4; wherein said means for applying electrical energy comprises four end electrodes attached respectively to the four ends of said two magnetoresistive elements, conductors connected to said end electrodes electrically connecting said two magnetoresistive elements in parallel, and means for applying a voltage across said four electrodes; and wherein said means for developing an output signal comprises a pair of center electrodes attached respectively to the geometrical centers of said two magnetoresistive elements developing thereacross said output signal during use of the transducer.

9. A transducer according to claim 8; wherein said two magnetoresistive elements extend linearly in the directions of relative displacement between same and said unidirectional magnetic field.

10. A transducer according to claim 8; wherein said two magnetoresistive elements extend curvilinearly along a circular arc in the direction of relative displacement between same and said unidirectional magnetic field.

* * * * *